Figure 1:
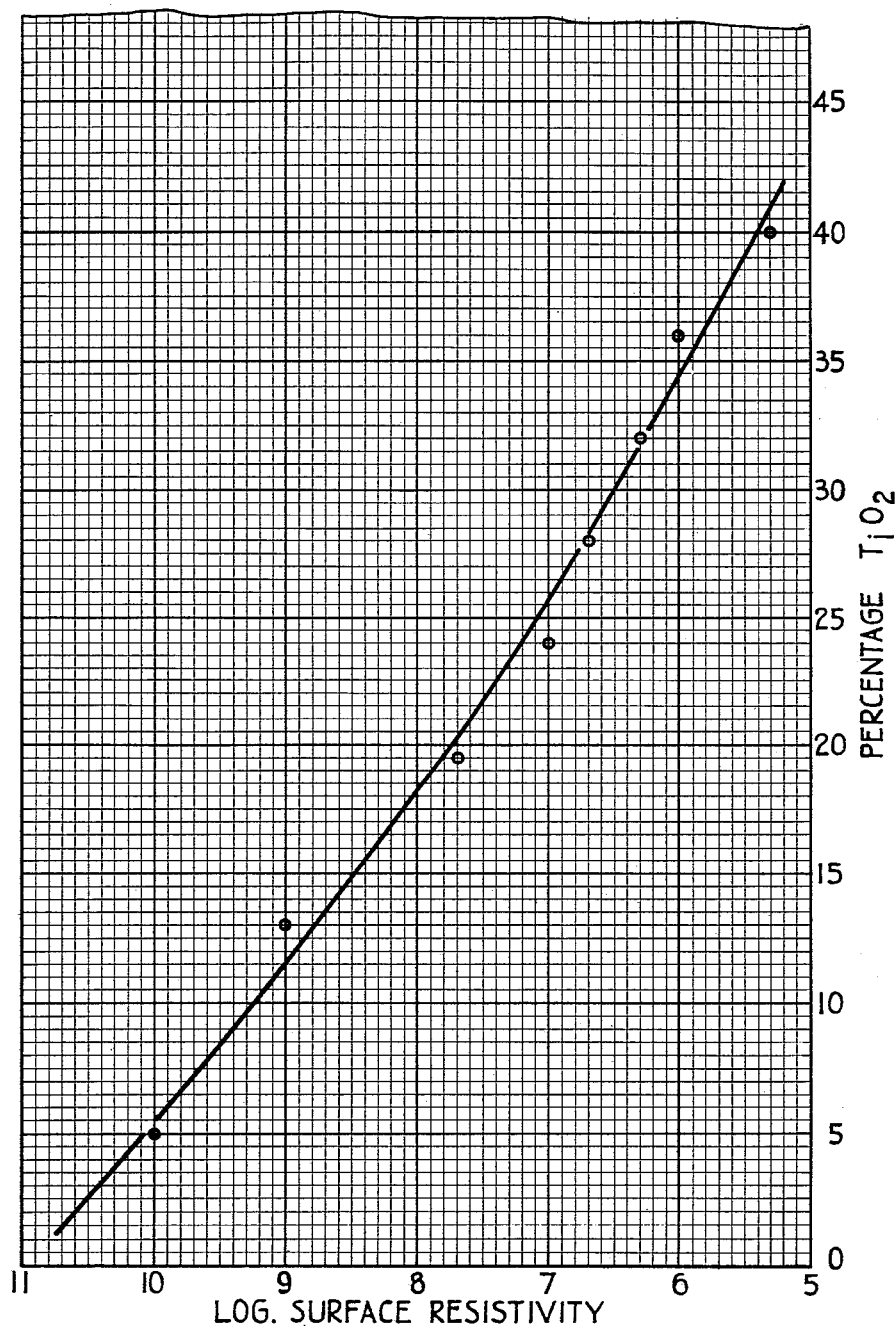

INVENTOR:
Colin Henry William Clark,

2,715,593

METHOD OF PROVIDING A CERAMIC BASE WITH A COATING OF BLUE TITANIA AND ARTICLE PRODUCED THEREBY

Colin H. W. Clark, Stourport-on-Severn, England, assignor to Steatite and Porcelain Products Limited, a corporation of Great Britain Application September 6, 1950, Serial No. 183,382

13 Claims. (Cl. 117—215)

This invention relates to ceramic electrical devices having conductive ceramic coatings provided thereon, and to the manufacture of such devices.

It is well known to provide so-called conducting or semi-conducting coatings on electrical devices. Thus, for example, high tension insulators and capacitors are commonly provided with such coatings for the purpose of dissipating stresses set up in service in the vicinity of the conductors, which stresses in the absence of any such dissipating means tend to cause undesirable corona discharge and consequent radio interference. Resistors also are known comprising a non-conducting ceramic element having a conducting or semi-conducting coating provided thereon, and contacts for the attachment of conducting wires or the like thereto. Such conducting or semi-conducting coatings usually comprise a layer of an oxide or oxides having conducting or semi-conducting properties, and may have an over-coating of glaze, or alternatively the said oxides may be incorporated in the glaze itself.

Known semi-conducting glazes are not always entirely satisfactory, especially for those applications where it is necessary to control the conductivity within comparatively close limits. In many cases it has been found impossible to control the conductivity satisfactorily, while in other cases the conductivity has been found to decrease in service under certain conditions. In other cases the semi-conducting glaze may be slightly rough and thus be more difficult to keep clean. Moreover it is necessary to control the coefficient of expansion of a ceramic glaze to avoid setting up mechanical stresses in it during firing since unfavorable stresses at the surface of a piece of ceramic (i. e. in the glaze) can have particularly bad effects on the mechanical strength of the piece. The incorporation of semi-conducting materials to obtain the required resistivity may alter the coefficient of expansion and it is often difficult to compensate for the effect on the coefficient of expansion without changing the resistivity.

It is also known that titania when fired under reducing conditions such as are employed in the firing of hard porcelain, or when fired in the presence of certain other oxides, tends to assume during the firing operation a conducting or semi-conducting form, which is often referred to as "blue" titania. However, partial or complete reversion to the non-conducting form normally occurs during cooling down after firing, according to the conditions prevailing during the cooling down process—i. e. oxidising conditions during cooling tend to cause substantially complete reversion to the non-conducting form.

According to one feature of the present invention I provide an improved ceramic electrical device having a conducting or semi-conducting coating provided on at least part of its surface, the effective conducting constituent of the said coating comprising blue titania.

According to another feature of the present invention I provide a method of producing such improved devices comprising coating at least part of the surface of a non-conducting ceramic base with a layer of a slip containing essentially titania, subsequently coating the said base with a glazing composition adapted to mature to a substantially impermeable state at a temperature above that at which titania assumes its conducting or semi-conducting form, and firing the double-coated device in conditions such that the titania assumes its conducting form and is subsequently protected from re-oxidation to the non-conducting form by the cover glaze.

According to still another feature of the invention I provide an alternative method of producing such improved devices comprising coating at least part of the surface of a non-conducting ceramic base with a layer of a slip comprising titania and fluxing ingredients, said slip being adapted to mature to a substantially impermeable state at a temperature above that at which titania assumes its conducting or semi-conducting form, and firing the single-coated device under conditions such that the titania assumes its semi-conducting form and is subsequently protected from re-oxidation to its non-conducting form by the impermeable coating of which it formed part.

The selection of a glaze which remains in an immature or pervious condition at the "blueing" temperature of the titania facilitates penetration of the reducing gases present in the furnace atmosphere during firing to effect the "blueing" of the titania. Subsequent maturing of the glaze to its more impervious form protects the underlying or embedded titania from subsequent oxidising conditions which would tend to cause it to revert to the non-conducting form.

The addition of certain oxides, for example of beryllium, chromium, copper, cobalt, nickel, manganese, molybdenum, tungsten and vanadium, and of certain other substances, e. g. magnesium thorate or zirconate, can inhibit or promote the inherent tendency of titania to assume its conducting form when prevailing conditions would tend to produce an unwanted degree of conductivity, either too much or too little. The addition of such oxides can therefore assist in obtaining within limits a desired degree of conductivity which otherwise might be impossible or impractical, e. g. due to prevailing furnace atmosphere conditions tending strongly to produce an undesired effect. It would appear also that the effect produced by at least some of the above named oxides depends upon the proportions added—a substantial amount, of the order of 10% of the titania content say, may produce the opposite effect to that resulting from an addition of 0.5–2% of the same substance. The invention therefore contemplates the addition to the slip of up to 10% of its titania content of one or more of the said oxides or substances to assist in controlling the conductivity and/or to counteract unfavorable atmospheric conditions in the furnace.

The conductivity of the coating composition may also be influenced considerably by adding other substances to the titania slip. Thus, for example, diluents such as clay, magnesia, alumina, ceria, silica, or the alkaline earth oxides may be added in amounts up to twenty parts diluent to one part titania. By varying the titania/diluent ratio, the conductivity of the coating can be controlled over a very wide range. The diluent is normally chosen to give a coefficient of thermal expansion similar to that of the base ceramic. If the base is porcelain and the same porcelain is used as diluent the fired titania/porcelain layer has a higher coefficient of expansion than the fired base. The coefficient of expansion can be reduced by modifying the composition of the porcelain used as diluent. One method is to add steatite, and a 93/7 porcelain/steatite mix has been found useful. Zircon porcelains (porcelains in which the silica is partly replaced by zirconia) or porcelains containing ceric oxide also have lower expansion coefficients.

Table I shows, by way of example, the effect of varying the titania/diluent ratio in a coating mixture containing no other ingredients, the diluent comprising 93/7 porcelain/steatite mixture as referred to hereinbefore having the following nominal composition:

| | Percent |
|---|---|
| Clay | 35 |
| Silica | 36 |
| Feldspar | 23 |
| Soapstone | 6 |

The test pieces were porcelain rods 1 cm. in diameter which before firing were dipped in the titania-containing slip for 10 seconds and when dry were then dipped in a standard transparent glaze slip for 1 second. The porcelain rods were then all fired in one saggar in a tunnel kiln. Control pieces, glazed only with the transparent glaze, were also fired in the same saggar. The control pieces after firing were white and non-conducting while the test pieces with the semi-conducting engobe were blue-grey in colour and had the conductivities shown in Table I. The conductivity was measured with a voltage of 4,000 volts A. C. applied to a length of 3″ of each rod and the rods were then broken to determine their mechanical strength. The average ultimate stress was 12,000 lbs./sq. in., there being no significant difference between those with the semi-conducting engobe and the control pieces.

Table I

| $TiO_2$, percent | Diluent, percent | Surface Resistivity, ohms |
|---|---|---|
| 40 | 60 | $2 \times 10^5$ |
| 36 | 64 | $1 \times 10^6$ |
| 32 | 68 | $2 \times 10^6$ |
| 28 | 72 | $5 \times 10^6$ |
| 24 | 76 | $1 \times 10^7$ |
| 19 | 81 | $5 \times 10^7$ |
| 13 | 87 | $1 \times 10^9$ |
| 5 | 95 | $1 \times 10^{10}$ |

The variation of conductivity of the coating mixtures shown in Table I is illustrated graphically in Figure 1, in which titania content is plotted against the logarithm of surface resistivity.

Figure 2:
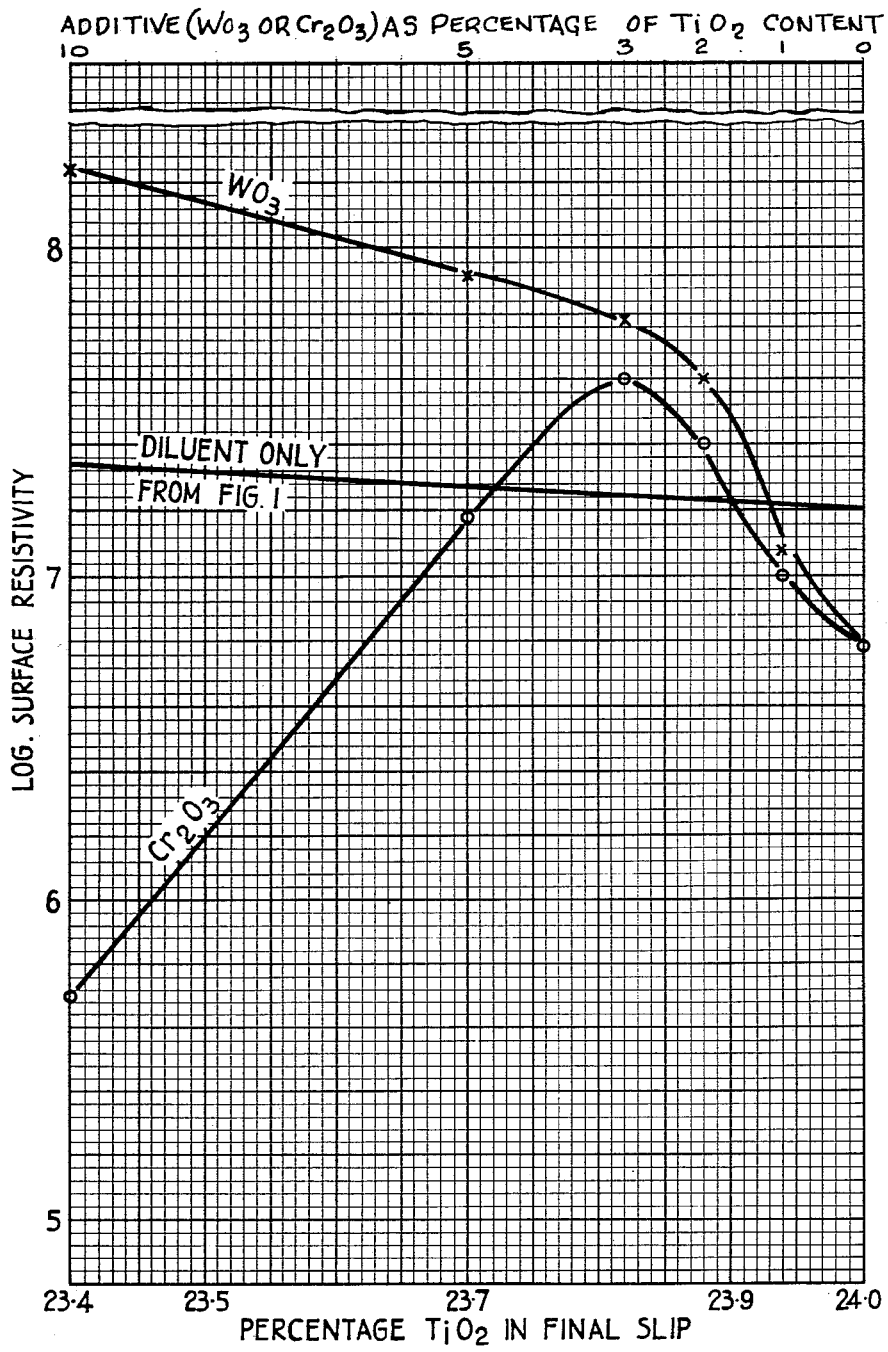

In contrast to the gradual effect of adding a diluent to vary the surface resistivity, as shown by Table I and Figure 1, the addition of certain other oxides exerts a more marked effect on the resistivity. This is illustrated by the data in Table II showing the effects of adding varying amounts of chromium and tungsten oxides to a basic coating composition comprising a basis of 24% titania and 76% of 93/7 porcelain/steatite diluent as described hereinbefore. The basis of this coating composition while nominally the same as that to which the data in Table I relates was in fact a different mix and the firing was effected at a different time, hence the variation in resistivity as between line 5 in Table I and line 1 in Table II. The effects of the additions shown in Table II are illustrated graphically in Figure 2, which also includes a curve showing the comparatively minor effect which would have been produced by corresponding quantities of diluents added in lieu of the tungstic and chromic oxides.

Table II

| Basic composition, Percent | Additive Oxide | | Surface Resistivity (Megohms), Basic composition | |
|---|---|---|---|---|
| | As percent of basic composition | As percent of $TiO_2$ | $WO_3$ | $Cr_2O_3$ |
| 100 | 0 | 0 | 6 | 6 |
| 99.76 | 0.24 | 1 | 12 | 10 |
| 99.52 | 0.48 | 2 | 40 | 25 |
| 99.28 | 0.72 | 3 | 60 | 40 |
| 98.8 | 1.2 | 5 | 80 | 15 |
| 97.7 | 2.3 | 10 | 170 | 0.5 |

In referring hereinbefore to control of conductivity by the present invention, it is not intended to imply that close control by ordinary standards, is necessary or easily attainable. For most applications, variations in conductivity of the order of 2 to 1 between maximum and minimum are tolerable while for some applications considerably greater variations are permissible. Even this degree of control is however very difficult to attain, as most semi-conducting materials are very sensitive to quite small variations in their composition, which can produce variations of 100 to 1 or even 1 million to 1 in conductivity. For the purposes of the present invention, it is necessary to control the firing conditions at least as closely as is customary in the production of high-grade electrical porcelain, to attain and maintain a satisfactory output of articles of tolerable conductivity. The relatively small variation previously referred to between the 24/76 titania-diluent compositions indicates the degree of consistency which might normally be expected when the necessary close control in production is exercised.

It is of course possible to subject coatings whose resistivity falls outside the tolerances permissible in any particular case to oxidising or reducing treatment at a temperature high enough to render the cover glaze and/or semi-conducting layer slightly gas permeable. In general the resistivity is reduced by such treatment in a reducing atmosphere such as hydrogen and increased by treatment in an oxidising atmosphere such as air.

Another advantage of the titania conducting glaze is its comparatively low temperature coefficient. While this temperature coefficient like that of all semi-conductors is high compared with the temperature coefficients of metallic conductors, it is lower than that of most other semi-conductors. Thus tests on a porcelain rod coated with an engobe containing 26% $TiO_2$ showed that its resistivity was halved by a temperature rise of 60° C., while published data indicated that other semi-conductors may have their resistivities halved by a temperature rise of as little as 25° C.

Still another advantage of the titania semi-conducting glaze is that the current is not directly proportional to the applied voltage, but is related to it by the equation $I = E^n$, "I" being the current due to an applied voltage "E" and the index "n" varying from little more than unity to about 2, but normally being about 1.7. This has the effect of increasing the stabilizing ability of the semi-conducting glaze on long insulators or insulators consisting of several units in series.

Where the conducting layer is applied as a titania-containing engobe subsequently to be covered by a glaze, there are other important advantages. In this case it is possible within limits to make adjustments in the composition of the engobe in order to obtain a required conductivity without affecting the properties of the cover glaze. The cover glaze can in fact be chosen from the point of view of smoothness, coefficient of expansion, colour, or other properties, as for an ordinary glazing application, the only other factor to be taken into consideration being its maturing temperature. Most of the conventional glazes used in the ceramic industry for ordinary purposes are, or can easily be adapted to be, sufficiently permeable in the initial stage of the firing process during which time the kiln atmosphere is non-oxidising, for the purposes of the present invention.

My invention may be applied to high tension insulators and capacitors, and also to resistors of the kind employing a conducting or semi-conducting coating thereon. Where it is necessary, as in the case of resistors, to make electrical connection between a conductor and the conducting coating on the device, the overlying glaze if any may be removed locally in any convenient manner, for example, by sand blasting or otherwise abrading it.

I claim:

1. A ceramic electrical base having a conducting coating provided on at least part of its surface, the effective conducting constituent of the said coating consisting essentially of blue titania, said constituent being protected from oxidation by a substantially impermeable cover glaze that matures at a temperature above that at which titania is converted to its conducting blue titania form.

2. A base as claimed in claim 1 in which the conducting titania coating contains a minor amount up to 10% of the titania content of an oxide from the group consisting of tungstic oxide and chromium oxide.

3. A base as claimed in claim 1 in which the conducting titania coating contains a minor amount up to 10% of the titania content of at least one of the oxides selected from the group consisting of the oxide of beryllium, the oxide of copper, the oxide of cobalt, the oxide of nickel, the oxide of manganese, the oxide of molybdenum and the oxide of vanadium.

4. A base as claimed in claim 1 in which the conducting titania coating contains a minor amount up to 10% of the titania content of a compound from the group consisting of magnesium thorate and zirconate.

5. A base as claimed in claim 1 in which the conducting titania coating contains a proportion of diluent substances, said substances being selected from the group consisting of clay, magnesia, alumina, silica, zirconia, ceria, alkaline earth oxide, feldspar, soap stone, porcelain, and steatite.

6. A base as claimed in claim 5 in which the conducting titania coating composition contains up to 20 parts of diluent to one part titania.

7. A base as claimed in claim 5 in which the diluent comprises a mixture of 93 parts porcelain to 7 parts steatite.

8. A base as claimed in claim 1 in which the thermal expansion characteristics of the conducting titania coating are like those of the ceramic base upon which it is deposited.

9. A base as claimed in claim 1 in which the conducting titania coating is incorporated in and forms a part of the said protective glaze.

10. A base as claimed in claim 1 wherein the conducting coating has a layer of blue titania as its conducting constituent and a layer of said substantially impermeable cover glaze superimposed on said layer of blue titania.

11. A method of producing devices of the type claimed in claim 1, which comprises coating at least part of the surface of a non-conducting ceramic base with a conducting coating, the effective conducting constituent of said coating consisting essentially of blue titania, and the said coating including a glazing composition which matures to substantially impermeable form at a temperature above that at which titania assumes its conducting form, firing the thus coated device to convert the titania to its conducting form and maturing said glazing composition whereby re-oxidation of said titania to its non-conducting form is prevented.

12. A method of producing devices of the type claimed in claim 10, which comprises coating at least part of the surface of a non-conducting ceramic base with a layer of a slip containing essentially titania, subsequently coating said base with a glazing composition which matures to substantially impermeable form at a temperature above that at which titania assumes its conducting form, firing the thus double-coated device to convert the titania to its conducting form and maturing said glazing composition whereby re-oxidation of said titania to its non-conducting form is prevented.

13. A method of producing devices of the type claimed in claim 8, which comprises coating at least part of the surface of a non-conducting ceramic base with a layer of a slip comprising titania and a glazing composition which matures to a substantially impermeable form at a temperature above that at which titania assumes its conducting form, firing the thus single-coated device to convert the titania to its conducting form and maturing the glazing composition of said coating whereby re-oxidation of said titania to its non-conducting form is prevented.

References Cited in the file of this patent

UNITED STATES PATENTS

| 648,518 | Ochs | May 1, 1900 |
| 2,154,387 | Sleeman | Apr. 11, 1939 |
| 2,590,893 | Sandborn | Apr. 1, 1952 |
| 2,590,894 | Sandborn | Apr. 1, 1952 |

FOREIGN PATENTS

| 467,113 | Great Britain | June 10, 1937 |